Patented Aug. 9, 1927.

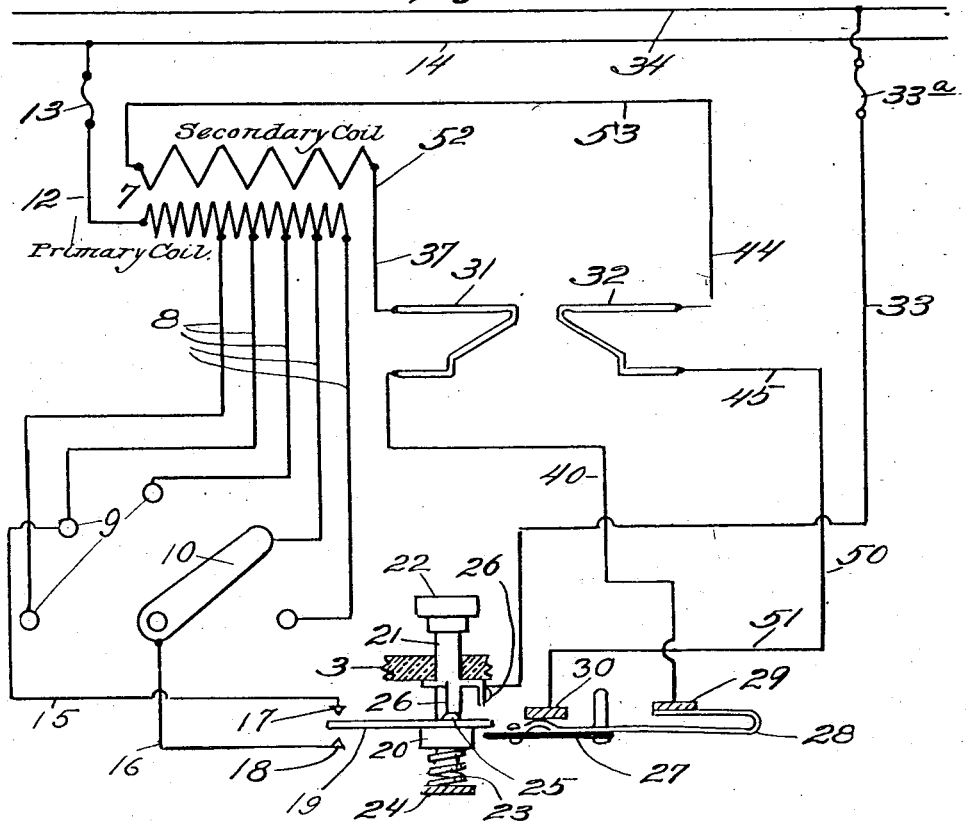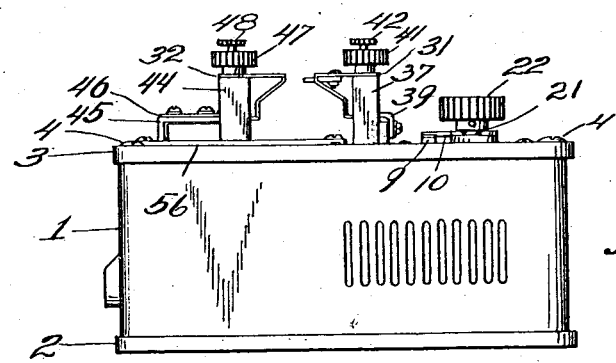

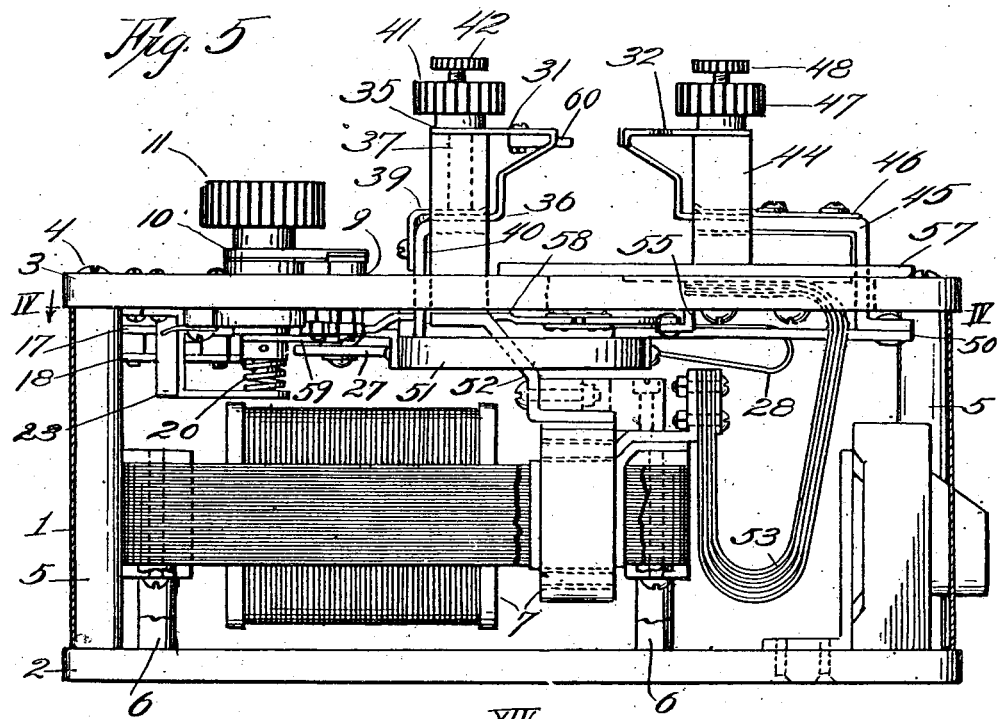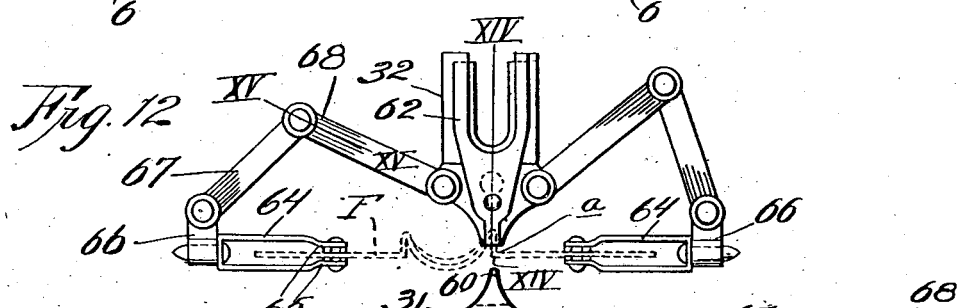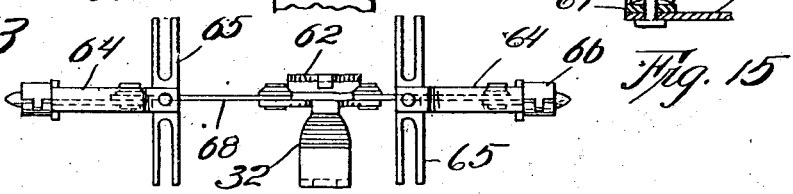

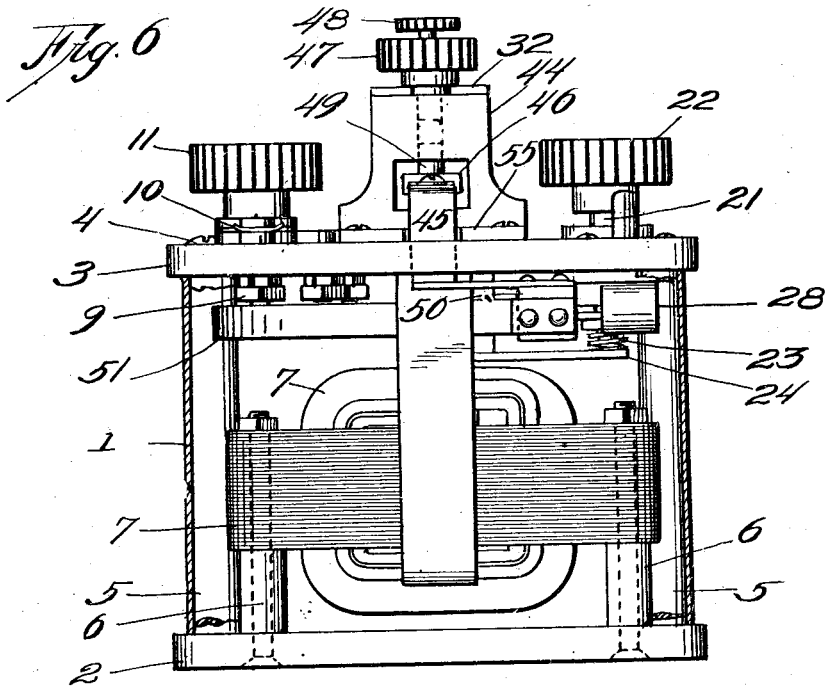
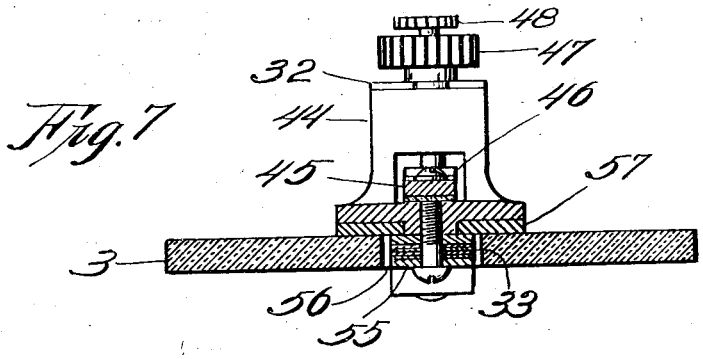
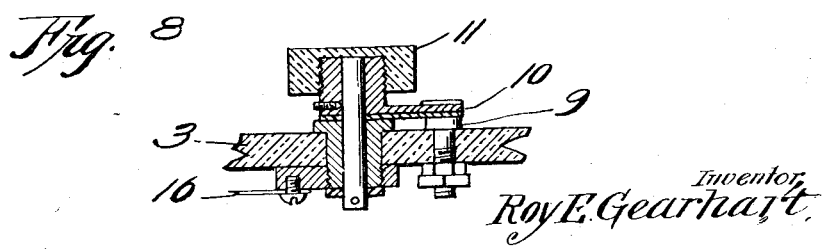

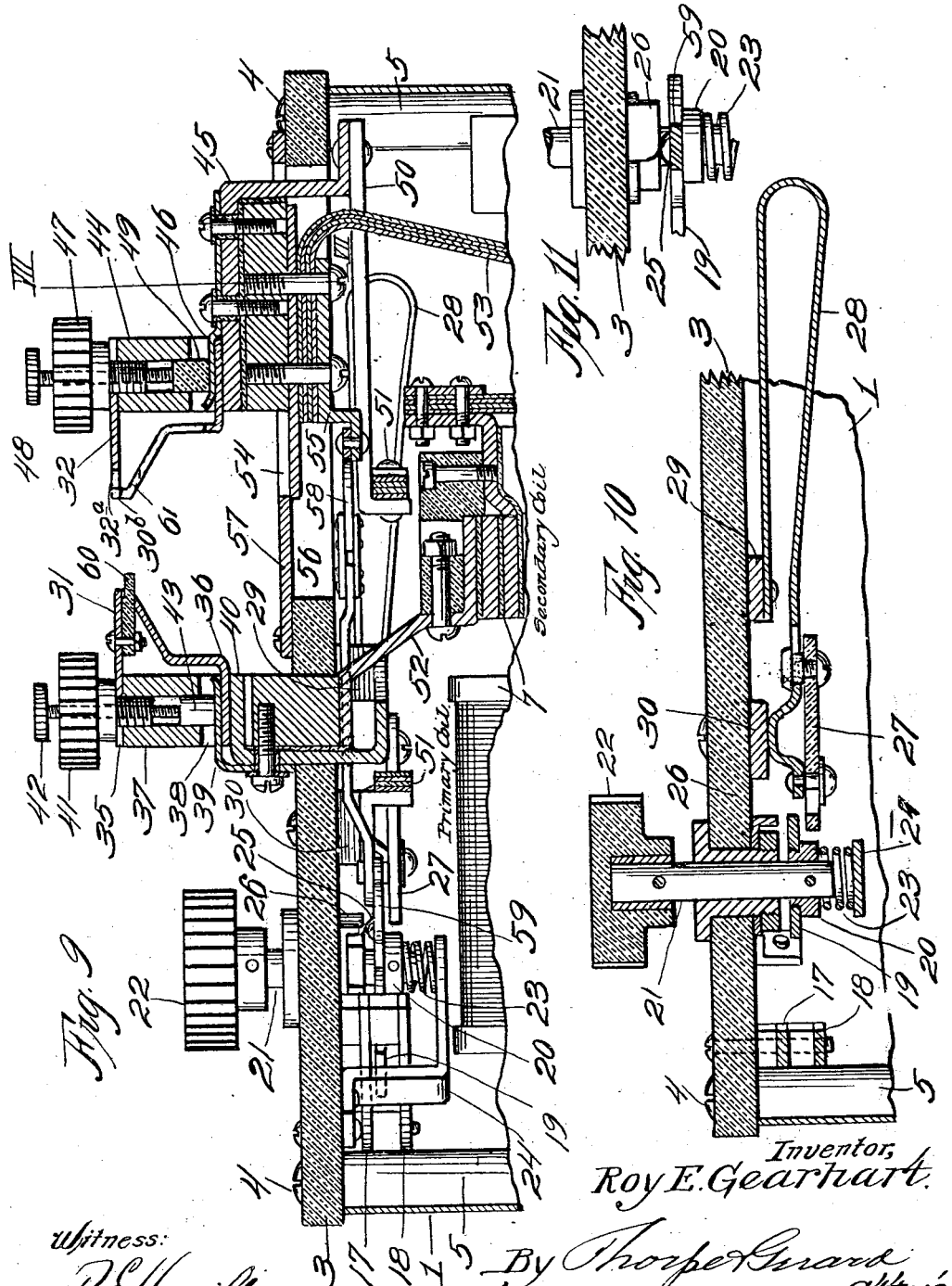

1,638,301

UNITED STATES PATENT OFFICE.

ROY E. GEARHART, OF KANSAS CITY, MISSOURI.

ELECTRIC WELDING OR SOLDERING DEVICE.

Application filed January 17, 1923. Serial No. 613,302.

This invention relates to soldering or welding transformers, and has for its object to produce a construction whereby welding or soldering operations can be performed without subjecting the parts to be united to any appreciable heat except at the point of union, and without danger of such parts being oxidized or pitted appreciably.

A further object is to provide a transformer in which provision is made for preheating the welding or soldering terminals to facilitate the actual welding or soldering operation.

Another object is to provide a transformer in which energy developed through the appliance itself, is utilized to preheat the terminals of the transformer, as distinguished from preheating terminals by the application of a flame or the like, or by heat generated from a source of electric current supply extraneous to the appliance.

A still further object is to provide a transformer adapted to develop a plurality of welding or soldering temperatures according to the character of the parts to be united.

With these objects in view the invention consists in certain novel and useful features of construction and combinations of parts as hereinafter described and claimed, and in order that it may be fully understood, reference is to be had to the accompanying drawings, in which:—

Figure 1 is a side elevation of an appliance embodying the invention;

Figure 2 is a diagrammatic view showing the electrical circuits of the invention;

Figure 5 is a view showing the mechanism of the appliance in side elevation and partly broken away, and showing the body of the casing in vertical section;

Figure 6 is an end elevation of the appliance, with the body portion of the casing in vertical section;

Figure 7 is a section taken on the line VII—VII of Figure 9;

Figure 8 is a section taken on the line VIII—VIII of Figure 3;

Figure 9 is a section taken on the line IX—IX of Figure 3;

Figure 10 is a section taken on the line X—X of Figure 4;

Figure 11 is a section taken on the line XI—XI of Figure 4;

Figure 12 is a plan view of a modified form of terminal and "work" support;

Figure 13 is an edge view of the same;

Figure 14 is a vertical section taken on the line XIV—XIV of Figure 12, and also shows in relative position, a clamping screw for holding the terminal in position; and Figure 15 is a section taken on the line XV—XV of Figure 12.

Figure 3:
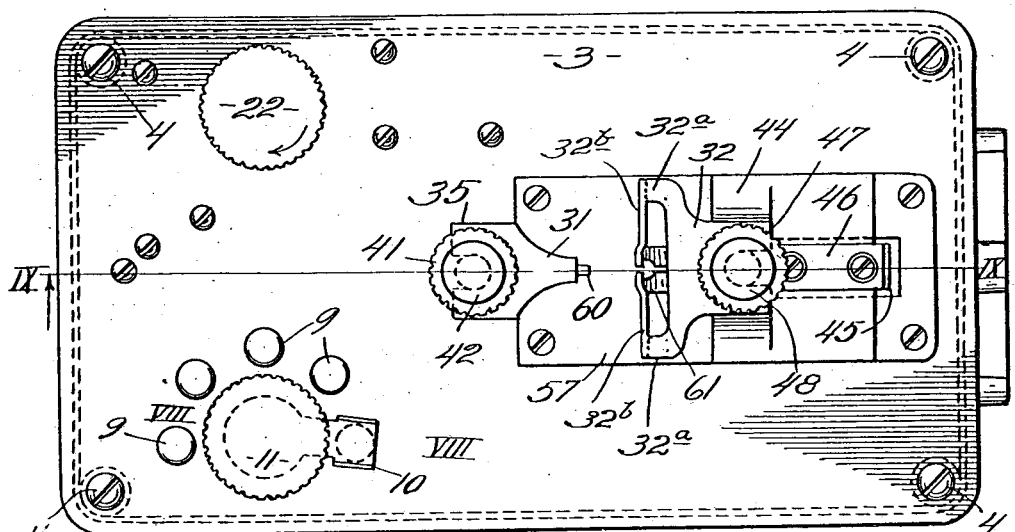
Figure 3 is an enlarged top plan view of the appliance.
Figure 4:
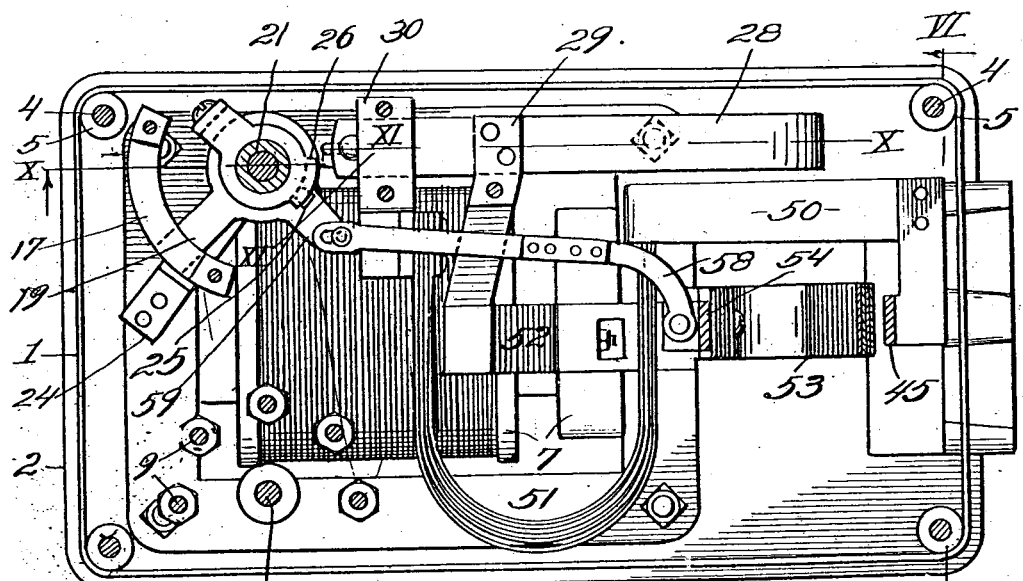
Figure 4 is a horizontal section taken on the line IV—IV of Figure 5.

Before proceeding with a detailed description of the invention, it is desired to state that the essential novelty of the invention centers in the thought of using preheated terminals, and the commercial practicability of the invention in utilizing energy of the appliance itself for effecting such preheating prior to raising the temperature of the terminals to a heat necessary to effect welding or soldering operations, it being understood in this connection however, that the preheating temperature alone may be sufficient to perform hard soldering of delicate work, such as eye glass chains and other parts of very small cross section. The preheating operation is also desirable where the terminals are metal, as preferred, as it restores to a plastic condition the borax or other flux adhering to the terminals, and dissipates or drives off impurities which would interfere with the passage of current or heat from the terminals to the "work," it being obvious that unless such impurities are removed by preheating of the terminals, a file or the like must be used to remove them.

Referring now to the detail construction, where like reference characters identify corresponding parts, a casing comprises a hollow body 1, a bottom 2 and a top 3, secured together by screws 4 engaging corner posts 5. Within the casing is secured on posts 6, an induction coil 7 of laminated type, the primary coil of which is connected at different points (see Figure 2) by conductors 8 with a series of contacts 9 for successive engagement by a switch 10 having an operating knob or handle 11. One end of the primary coil is connected by a conductor 12 and fuse 13 to a line conductor 14 in circuit with a suitable source of electric current supply, not shown.

One of the contacts 9 and the switch 10, are respectively connected by conductors 15 and 16 to a pair of contacts 17 and 18 of a switch instrumental in effecting the raising of the temperature of terminals hereinafter identified, for preheating and welding or soldering purposes. The blade 19 of the last-named switch is secured to a collar 20 pinned to a stem 21 journaled in the top 3, and provided at its upper end with an operating knob 22. A lift spring 23 is interposed between the collar and a fixed bracket or support 24, for normally holding the blade elevated, and a protuberance 25 on the hub of the blade, engages a fixed lug 26 when the said switch is in normal or inoperative position, to prevent the blade engaging the contact 17, which like contact 18, is of arcuate form and of such length that the switch blade, regardless of its radial position, may be caused by downward movement, to engage contact 18, and may be permitted to move upward to engage contact 17 except when in its initial position, as at that time the engagement of the protuberance 25 and lug 26 inhibits engagement of the switch with contact 17. To prevent accidental contact between the switch blade and contact 18, through inadvertent light downward pressure on the knob 22, an insulating plate 27 is upheld below the switch blade by a relatively stiff spring bus bar 28, normally constituting an electrical connection between a pair of contacts 29 and 30, electrically connected through the preheating and welding or soldering terminals 31 and 32 respectively to opposite ends of the secondary coil of the induction coil 7 which is of step-down transformer type. The lug 26 electrically connected to the switch plate, is also connected by a conductor 33 and fuse 33ª, to a feed conductor 34, the various electrical connections described being shown diagrammatically by Figure 2.

The terminal 31 is attenuated at its point nearest terminal 32, and preferably is formed with upper and lower wide ends 35 and 36, the former fitting upon a fixed post 37, and the end 36 projecting into an opening 38 in said post between a spring or clamp plate 39 and a bracket 40 secured to but insulated from post 37, and forming part of the electrical connection between the said terminal and conductor 29. A clamp screw 41 secures the terminal end 35 in electrical connection with post 37, and a second clamp screw 42, acts on an insulating piece 43, to clamp the terminal end 36, firmly between clamp 39 and bracket 40, this arrangement permitting terminal 31 to be instantly placed in position or removed from position in the event it is desired to substitute another terminal appropriate to a different piece of "work."

A post 44 is secured to but insulated from a bracket 45, which with a spring clamp 46, projects into an opening in the post and engages the lower wide end of terminal 32, the upper wide end of the terminal resting upon the post, and to secure the terminal for ready detachment, a clamping screw 47 engages the upper arm, and a second clamping screw 48 acts on an insulating piece 49, to clamp the lower arm of the terminal firmly between the bracket 45 and clamp plate 46, and a bracket 45 is connected by a bar 50 and spring 51 to contact 30 (see Figure 9).

The electrical connection between the secondary coil and the upper end of the terminal 31, comprises the post 37 and the arm 52, and the corresponding connection between the secondary coil and the upper arm of terminal 32, comprises the post 44, and the U-shaped spring bar 53, it being noted (see Figure 9) that the upper end of the spring bar 53 is clamped to the post 44 in conjunction with a plate 54 and a bracket 55, and with such elements is slidable in a slot 56 in the cover 3, to effect approaching or receding movement of the terminal 32 with respect to terminal 31. A plate 57 overlies slot 56 and is slotted to accommodate movement of post 44, and in conjunction with plate 54, guards against the fall of "work" or other foreign articles into the casing or box through slot 56 when the terminals are spaced apart. The bracket 55 is pivotally connected to a link 58, which has a pin-and-slot connection with an arm 59 of the hub of the switch 19, so that operation of the switch in one direction or the other shall impart corresponding movement to terminal 32.

For conveniently sustaining a ring in position for soldering or welding a break therein, an arm 60 of non-conducting material is secured to terminal 31, and projects therefrom toward terminal 32, and to permit adjustment of the latter until it clamps the broken part against the attenuated end of terminal 31, the terminal 32 is provided with an opening 61 to receive the end of said arm. The upper arm of the terminal 32 is preferably of Y-shape (see Figure 3) and the ends of the arms 32ª are formed with branches 32ᵇ spaced slightly apart so as to provide for slight independent yielding action if the "work" is slightly thicker at one side of the break therein than at the other. This insures a firmer clamping of the object, but the chief reason for the construction described, is to insure a good electrical contact at both sides with the "work" and hence provide for a more efficient and dependable welding operation by insuring the passage of current through the "work", and the heating thereof at both sides of the break therein.

In Figures 12 to 15, inclusive, a modified construction of the terminals appears, the same being peculiarly appropriate for properly supporting eye-glass frames for repair purposes. In said construction, one terminal is the sole support for the "work", shown in this instance, as an eye-glass frame F broken at point a. Such terminal has a body portion 32 corresponding substantially to terminal 31, and a clamp member 62 fastened at its rear end to the body portion and bifurcated to accommodate the clamping screw 47 for securing the body portion to its respective post. An operating screw 63 (see Figure 14) engages the clamp member and is swivelled to the body portion so that the eye-glass frame at one side of and adjacent to the "break" therein can be securely engaged. To receive each lens or lens frame, forks 64 are provided, and these forks carry cross-pieces 65 to span lenses held therein against tipping movements, the cross-pieces engaging the part of the frame not held between the terminal and clamp arm, supporting its lens so as to hold the respective part of the frame in abutting relation at the point a, to be welded, with the other part of the frame. The forks are frictionally pivoted to clips 66, and the latter are frictionally pivoted by links 67 and 68, to the terminal 62, to provide for such adjustment of the forks as necessitated by the location of the break to be welded.

Before proceeding with a description of the operation of the appliance, it is desired to state that with a transformer of capacity to produce a low voltage, say approximately two volts in the induced circuit through the secondary coil, it is impracticable to employ carbon terminals. Any metals which will not readily oxidize, can be employed as terminals. With such terminals preheating is indispensable, as otherwise the flux usually borax, on the terminals, if in solidified condition, as when cold, will constitute insulation between the terminals and the "work" and prevent the flow of current from one terminal through the "work" to the other terminal.

With the parts positioned as shown by Figure 2, it will be seen that no circuit is completed but that sufficient rotation of knob 22 in the direction indicated by the arrow, Figure 3, to withdraw protuberance 25 from under lug 26, will result in the spring 23 lifting the switch knob 19 into engagement with contact 17, and thereby completing a circuit as follows: from line conductor 14 through fuse 13, conductor 12 the primary coil of the transformer, conductor 8, contact 9, conductor 15, contact 17, switch blade 19, conductor 33, and fuse 33ª to line conductor 34. This circuit produces a circuit by induction as follows: from the secondary coil, through conductors 52 and 37, terminal 31, conductor 40, contact 29, bus bar 28, contact 30, conductors 51, 50 and 45, terminal 32, and conductors 44 and 53 back to the secondary coil. This circuit will quickly raise the attenuated ends of the terminals to a red heat, and melt any flux coated thereon so that it cannot prevent the flow of current from one terminal to the other through interposed "work" engaging the terminals, as hereinafter explained, it being understood in this connection the particular contact 9 wired to contact 17, is that tapped from the primary coil at a point which will result in generating sufficient heat in the terminals to weld or solder small articles such as ordinary finger rings, watch chains and the like. It will also be understood, as explained more in detail hereinafter, that the rotary adjustment of the switch effects relative approaching movement of the terminals, this adjustment continuing until a ring, for example, hung on arm 60 or otherwise supported, is clamped between and constitutes a branch conductor between the terminals at their attenuated points, this ring or "work," being thus heated by conduction of heat from the electrodes and also by passage or leakage of a portion of the current through the work and the "break" welded or soldered. As this is accomplished without breaking the circuit through contacts 29 and 30, the removal of the "work" is not attended by any material "sparking" and hence does not "pit" the "work" or the terminals.

If the "work" is very delicate, the terminals are first preheated, and then after setting the switch 10 in engagement with a contact 9 for developing the desired low heat, switch blade 19 is depressed by pressure on knob 22, to break the primary circuit through contact 17 and make it through contact 18, and break the secondary circuit, this latter action occurring through downward pressure of the switch blade hub on the plate 27 carried by the bus-bar normally connecting contacts 29 and 30. The "work," assuming the switch 22 has not been turned too far, or has been reversely turned partway to provide requisite space, is now disposed between the terminals and then the latter are brought together against the work and retained in such position until the welding or soldering operation is effected, it being apparent that in the case instanced, the secondary circuit is as follows: from the coil through conductors 52, 37, 31, the "work," 32, 44 and 53 back to the coil. For welding or soldering bulky "work," the switch 10 is shifted to engagement with a contact adapted, from its point of connection with the primary coil, to develop the required degree of heat in the terminals. It will thus be understood that the adjustment of the switch 10 provides for the generation of different degrees of heat, and that while only one degree of heat can be generated for preheating purposes, the bridging of the gap between the terminals by "work" of different bulk, will actually develop different degrees of heat in the terminals as a relatively large piece of "work" will carry more current and the terminals be less highly heated, than with a small piece of "work," the secondary circuit in both cases being in multiple, whereas in the welding or soldering action, the circuit is through the "work," and there is no branch circuit or path for the flow of the current.

It will be understood of course, that to insure satisfactory and repeated welding or soldering operations, the metal or equivalent terminals must be kept clean, and this is accomplished by the use of a non-oxidizing flux or its equivalent, and avoids the necessity of filing, scraping or otherwise mechanically treating the terminals to remove oxidation or other current-impeding coatings thereon.

With this machine, delicate "work" can be soldered by the softening under heat, of a deposit of solder left on the terminals or either of them from a previous soldering operation, which is not possible with carbon terminals as solder will not adhere thereto. The fact that solder will adhere to the terminals facilitates the operation of soldering and avoids the annoyance and time lost incidental to the extreme care which must be exercised in soldering small "work" with carbon terminals. Of course when metal terminals are employed, and the "work" held in contact with them constitutes a conductor, such "work" must be removed while the solder is hot and plastic. If the current was cut off an appreciable time before an attempt was made to remove the "work" the latter would be found to adhere to the terminals. Ordinarily the switch is manipulated to reestablish the preheating circuit, and while this is in action the "work" is removed.

From the above description it will thus be apparent that I have produced a soldering or welding transformer embodying the features of advantage enumerated as desirable in the statement of the objects of the invention, and while I have illustrated and described the preferred form of embodiment of the invention, it will be apparent that it is susceptible of modification in minor particulars without departing from the principle of construction or mode of operation involved.

What I claim is:

1. In apparatus of the character described, a transformer and means for circulating electric current to energize the primary and induce current in the secondary of said transformer, a pair of spaced conducting terminals having opposed intermediate attenuated points, and connections establishing a circuit in series from the said secondary through said terminals to preheat the attenuated points thereof.

2. In apparatus of the character described, a transformer and means for circulating electric current to energize the primary and induce current in the secondary of said transformer, a pair of spaced conducting terminals, connections establishing a circuit in series from the said secondary through each terminal to heat the same, and means for opening the circuit through each terminal to shunt the current through the "work" across the space between the terminals when the latter are physically connected by the "work" to be soldered or welded.

3. In apparatus of the character described, a transformer and means for circulating electric current to energize the primary and induce current in the secondary of said transformer, and a pair of spaced terminals connected in series with the said secondary and provided intermediate their length with opposed attenuated portions, the attenuated portions being relatively adjustable toward and from each other for clamping between them or releasing "work" to be welded.

4. In apparatus of the character described, a transformer and means for circulating electric current to energize the primary and induce current in the secondary of said transformer, a pair of spaced terminals connected in series with the said secondary and provided with attenuated portions and relatively adjustable toward and from each other, electrical connections between the ends of the terminals at the opposite side of the said attenuated portions from the secondary of the transformer, and means to break the circuit through said electrical connections at the opposite side of the attenuated portions of the terminals from said transformer, to shunt the induced current from one terminal to the other through "work" physically connecting the attenuated portions of the terminals.

5. In apparatus of the character described, a transformer and means for circulating electric current to energize the primary and induce current in the secondary of said transformer, a pair of spaced conducting terminals, connections establishing a circuit in series from the said secondary through each terminal to heat the same, and means for opening the primary circuit and opening the secondary circuit at the opposite side of the terminals from the transformer and for reclosing the circuit through the primary of the transformer.

6. In apparatus of the character described, a transformer and means for circulating electric current to energize the primary and induce current in the secondary of said transformer, a pair of spaced conducting terminals, connections establishing a circuit in series from the said secondary through each terminal to heat the same, means for opening the primary circuit and opening the secondary circuit at the opposite side of the terminals from the transformer and for reclosing the primary circuit through the transformer, and means for varying the resistance to the flow of current through the primary coil of the transformer to proportionately change the amperage of the induced current.

7. In apparatus of the character described, a pair of posts, welding terminals carried thereby having opposed points susceptible of being heated by the flow of electric current through the terminals, a transformer having its secondary coil electrically connected to ends of the terminals respectively, a pair of contacts respectively electrically connected to the opposite ends of said terminals, a second pair of contacts, one electrically connected to the primary coil of the transformer, means for making and breaking electrical connection between the said primary coil and the other of said second pair of contacts, a switch for electrical connection with either of the last-named contacts, electric current supply connections for the switch and the primary coil of the transformer, and means normally closing the secondary circuit through the first-named pair of contacts.

8. In apparatus of the character described, a pair of posts, welding terminals carried thereby having opposed points susceptible of being heated by the flow of electric current through the terminals, a transformer having its secondary coil electrically connected to ends of the terminals respectively, a pair of contacts respectively electrically connected to the opposite ends of said terminals, a second pair of contacts, one electrically connected to the primary coil of the transformer, means for making and breaking electrical connection between the said primary coil and the other of said second pair of contacts, a depressive rotary post, a fixed lug in electrical contact with the rotary post, an electric current supply in circuit with said lug and with the primary coil of the transformer, a switch blade rigid with the rotary post, a spring normally holding the blade up against the lug and between and out of contact with the said second pair of contacts and adapted when the post is rotated sufficiently to engage the blade with the overlying contact of the said second pair, and means normally closing the secondary circuit through the first-named pair of contacts and movable to break such circuit by sufficient depression of the rotary post to bring the said blade in contact with the other of the second pair of contacts.

9. In apparatus of the character described, a pair of posts, welding terminals carried thereby having opposed points susceptible of being heated by the flow of electric current through the terminals, a transformer having its secondary coil electrically connected to ends of the terminals respectively, a pair of contacts respectively electrically connected to the opposite ends of said terminals, a second pair of contacts, one electrically connected to the primary coil of the transformer, means for making and breaking electrical connection between the said primary coil and the other of said second pair of contacts, a depressive rotary post, a fixed lug in electrical contact with the rotary post, an electric current supply in circuit with said lug and with the primary coil of the transformer, a switch blade rigid with the rotary post, a spring normally holding the blade up against the lug and between and out of contact with the said second pair of contacts and adapted when the post is rotated sufficiently to engage the blade with the overlying contact of the said second pair, and means normally closing the secondary circuit through the first-named pair of contacts and movable to break such circuit by sufficient depression of the rotary post to bring the said blade in contact with the other of the second pair of contacts, sufficient rotary movement of the rotary post after the depression thereof, permitting reaction of the means last mentioned to reestablish electrical connection between the first-named pair of contacts.

10. In apparatus of the character described, a pair of posts, welding terminals carried thereby having opposed points susceptible of being heated by the flow of electric current through the terminals, a transformer having its secondary coil electrically connected to ends of the terminals respectively, a pair of contacts respectively electrically connected to the opposite ends of said terminals, a second pair of contacts, one electrically connected to the primary coil of the transformer, means for making and breaking electrical connection between the said primary coil and the other of said second pair of contacts, a depressive rotary post, a fixed lug in electrical contact with the rotary post, an electric current supply in circuit with said lug and with the primary coil of the transformer, a switch blade rigid with the rotary post, a spring normally holding the blade up against the lug and between and out of contact with the said second pair of contacts and adapted when the post is rotated sufficiently to engage the blade with the overlying contact of the said second pair, means normally closing the secondary circuit through the first-named pair of contacts and movable to break such circuit by sufficient depression of the rotary post to bring the said blade in contact with the other of the second pair of contacts, and means actuated by rotary movement imparted to the said switch plate by the rotary post, to effect relative approaching or receding movement of the said terminals.

11. In an electric welder, a plurality of spaced electrodes, a source of electrical energy, and closed circuit connections between said source of energy and electrodes to cause the current to pass through the contact or working faces of the electrodes to heat the latter whereby when work is introduced between the electrodes a portion of the current shall pass through the work.

12. In an electric welder, a pair of spaced electrodes, a source of electrical energy, and circuit connections connecting said electrodes in a closed series circuit with said source of energy the current passing through the contact or working faces of said electrodes whereby when work is introduced between the electrodes a portion of the current shall pass through the work.

In witness whereof I hereunto affix my signature.

ROY E. GEARHART.